(12) United States Patent
Subramaniam et al.

(10) Patent No.: US 8,793,469 B2
(45) Date of Patent: Jul. 29, 2014

(54) PROGRAMMABLE LOGIC ARRAY AND READ-ONLY MEMORY AREA REDUCTION USING CONTEXT-SENSITIVE LOGIC FOR DATA SPACE MANIPULATION

(75) Inventors: Kameswar Subramaniam, Austin, TX (US); Anthony Wojciechowski, Austin, TX (US); Jonathan D. Combs, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 685 days.

(21) Appl. No.: 12/971,819

(22) Filed: Dec. 17, 2010

(65) Prior Publication Data

US 2012/0159129 A1    Jun. 21, 2012

(51) Int. Cl.
*G06F 9/30*    (2006.01)

(52) U.S. Cl.
CPC .......... *G06F 9/30145* (2013.01); *G06F 9/3017* (2013.01)
USPC ............................. 712/209; 712/220; 712/300

(58) Field of Classification Search
None
See application file for complete search history.

(56) References Cited

U.S. PATENT DOCUMENTS

| | | | | |
|---|---|---|---|---|
| 5,881,279 | A * | 3/1999 | Lin et al. | 712/244 |
| 6,115,496 | A * | 9/2000 | Nguyen et al. | 382/166 |
| 6,564,314 | B1 * | 5/2003 | May et al. | 712/210 |
| 2001/0025337 | A1 * | 9/2001 | Worrell et al. | 712/209 |
| 2002/0199083 | A1 * | 12/2002 | Kao et al. | 712/209 |
| 2004/0034757 | A1 * | 2/2004 | Gochman et al. | 711/219 |
| 2007/0204133 | A1 * | 8/2007 | Taniuchi | 712/209 |
| 2009/0172356 | A1 * | 7/2009 | Valentine et al. | 712/208 |
| 2012/0284461 | A1 * | 11/2012 | Larin et al. | 711/125 |

* cited by examiner

*Primary Examiner* — Robert Fennema
*Assistant Examiner* — William B Partridge
(74) *Attorney, Agent, or Firm* — Lowenstein Sandler LLP

(57) ABSTRACT

A computer, circuit, and computer-readable medium are disclosed. In one embodiment, the processor includes an instruction decoder unit that can decode a macro instruction into at least one micro-operation with a set of data fields. The resulting micro-operation has at least one data field that is in a compressed form. The instruction decoder unit has storage that can store the micro-operation with the compressed-form data field. The instruction decoder unit also has extraction logic that is capable of extracting the compressed-form data field into an uncompressed-form data field. After extraction, the instruction decoder unit also can send the micro-operation with the extracted uncompressed-form data field to an execution unit. The computer also includes an execution unit capable of executing the sent micro-operation.

19 Claims, 5 Drawing Sheets

PROGRAMMABLE LOGIC ARRAY AND READ-ONLY MEMORY AREA REDUCTION USING CONTEXT-SENSITIVE LOGIC FOR DATA SPACE MANIPULATION

FIELD OF THE INVENTION

The invention relates to programmable logic arrays and read-only memories in an instruction decoder in a processor.

BACKGROUND OF THE INVENTION

Computer processor micro-operations (UOPs) include several fields. Some of the fields are the instruction opcode field (e.g., move, shift, etc.), a source field, and a destination field. There are other fields also inherently included within even many basic UOPs, such as address size, address scale, and register type fields (e.g., integer, floating point, etc.). The combination of all the fields results in a huge data space, of which only a portion is actually used. The huge data space takes up precious circuit real estate in programmable logic arrays (PLAs) and read-only memories (ROMs) within the instruction decoder(s) in a processor core.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a computer, a circuit, and a machine-readable medium to manage the decompression of compressed stored data fields associated with micro-operations in a processor core are disclosed.

In many embodiments, a processor is capable of utilizing stored compressed versions micro-operation (UOP) data fields. The processor can store compressed versions of several UOP data fields in internal programmable logic arrays (PLAs) and read-only memories (ROMs). These storage structures produce UOPs as output, which are comprised of a set of fields that controls a portion of the total execution of the processor. The combination of all the fields for each of the many UOPs stored results in a huge data space. Generally, only a portion of this PLA and ROM data space is actually used. The processor is capable of expanding these stored UOP data fields into their corresponding uncompressed versions. Finally, the processor sends the UOPs and the expanded versions of their respective data fields downstream to the processor's execution units.

Storing a substantial number of UOPs in compressed forms creates multiple benefits. The area of the PLA and ROM storage structures would be reduced, which saves on semiconductor die size of each processor core. Additionally, reducing the area of the PLA and ROM storage structures lowers leakage power consumption in the core. Furthermore, using a less absolute number of stored UOP fields in the PLAs and ROMs minimizes the redundancies in these structures. Minimizing the redundant structures helps lower the costs to validate the core.

Figure 1:
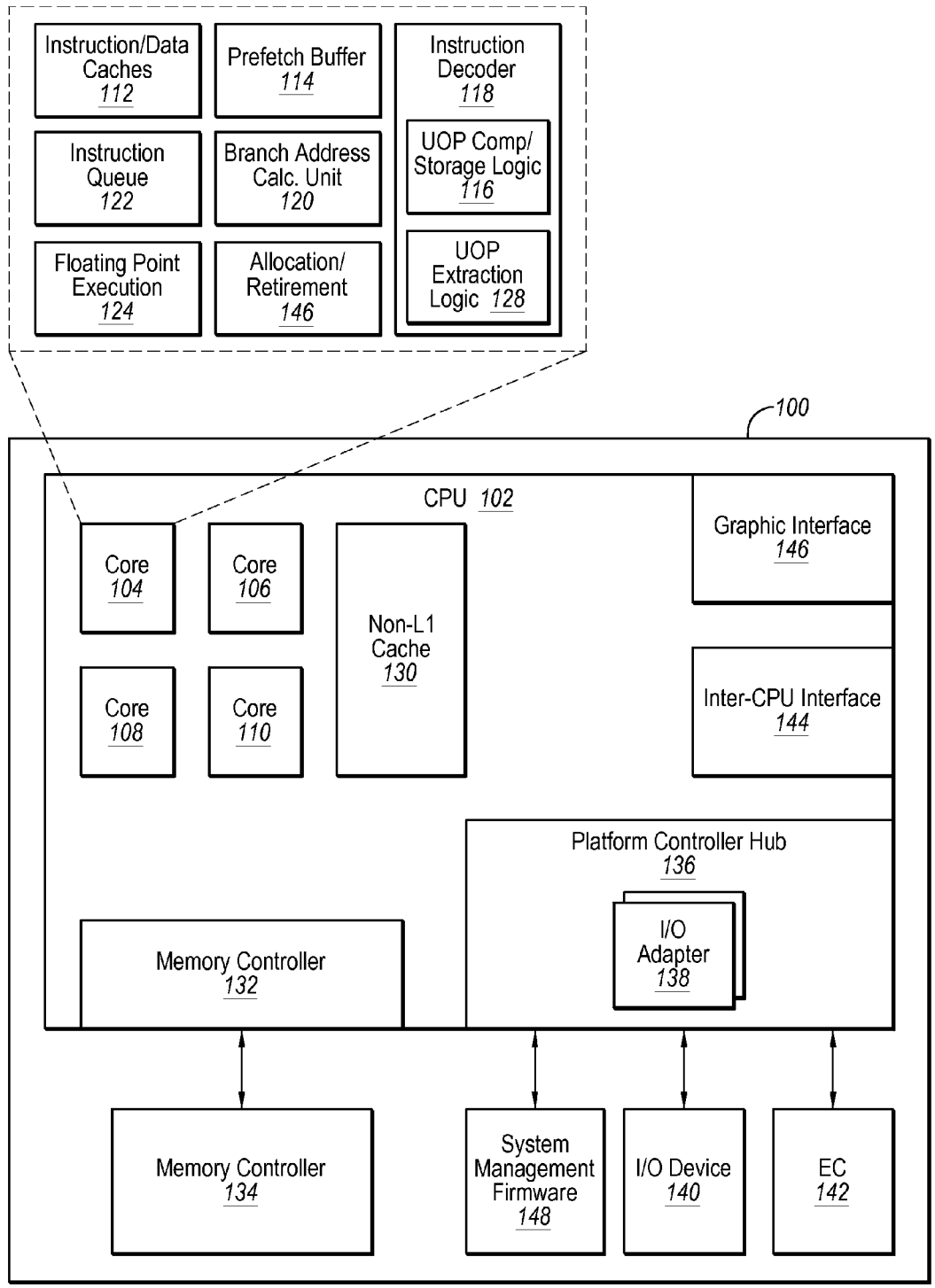
FIG. 1 illustrates an embodiment of a computer system capable of providing for and operating with compressed data fields in micro-operations.

FIG. 1 illustrates an embodiment of a computer system capable of providing for and operating with compressed data fields in micro-operations.

Computer system 100 is shown. The computer system may be a desktop, server, workstation, laptop, handheld, television set-top, media center, game console, integrated system (such as in a car), or other type of computer system. In several embodiments the computer system 100 includes one or more central processing units (CPUs), also referred to as "processors." Although in many embodiments there are potentially many CPUs, in the embodiment shown in FIG. 1 only CPU 102 is shown for simplicity. CPU 102 may be an Intel® Corporation CPU or a CPU of another brand. CPU 102 includes one or more cores in different embodiments. CPU 102 is shown including four cores (cores 104, 106, 108, and 110).

In many embodiments, each core includes several internal functional blocks/units/logic components such as those shown in the blown up view of core 104. For example, core 104 includes at least instruction/data (i.e., Level 1, L1) caches 112, a prefetch buffer 114, an instruction decoder 118, a branch address calculation unit 120, an instruction queue 122, a floating point execution unit 124, and an allocation/retirement unit 126, among others. Several of these units and logic components will be discussed in significant detail below in regard to FIG. 2. In general, there are more units, registers, and other circuitry within each core than those units shown in core 104 including the potential for several copies of each of the units shown (e.g., one or more integer/address execution units, 3 floating point units, etc.), but additional units are not shown to maintain the clarity of the important elements of FIG. 1.

In a single-threaded core, each core may be referred to as a hardware thread. When a core is multi-threaded or hyperthreaded, then each thread operating within each core may also be referred to as a hardware thread. Thus, any single thread of execution running in the computer system 100 may be referred to as a hardware thread. For example, in FIG. 1, if each core is single-threaded, then there are four hardware threads present in the system (four cores). On the other hand, if each core is multi-threaded and has the capability of maintaining the states of two threads simultaneously, then there are eight hardware threads present in the system (four cores with two threads per core).

CPU 102 may also include one or more non-L1 caches, such as non-L1 cache 130. In many embodiments, at least one non-L1 cache, such as cache 130, is present in the CPU 102 outside of any given core. Additionally, in many embodiments, cache 130 is shared between the four cores shown. In other embodiments that are not shown, additional non-L1 caches other than cache 130 are implemented. In different embodiments cache 130 may be apportioned in different ways. Additionally, cache 130 may be one of many different sizes in different embodiments. For example, cache 130 may be an 8 megabyte (MB) cache, a 16 MB cache, etc. Additionally, in different embodiments cache 130 may be a direct mapped cache, a fully associative cache, a multi-way set-associative cache, or a cache with another type of mapping. In many embodiments, cache 130 may include one large portion shared among all cores or may be divided into several separately functional slices (e.g., one slice for each core). Cache 130 may also include one portion shared among all cores and several other portions that are separate functional slices per core.

In many embodiments, CPU 102 includes an integrated system memory controller 132 to provide an interface to communicate with system memory 134. In other embodiments that are not shown, memory controller 132 may be located in a discrete chip separate from CPU 102 elsewhere in computer system 100.

System memory 134 may comprise dynamic random access memory (DRAM), such as a type of double data rate (DDR) DRAM, non-volatile memory such as flash memory, phase change memory (PCM), or another type of memory technology. System memory 134 may be a general purpose memory to store data and instructions to be operated upon by CPU 102. Additionally, there may be other potential devices within computer system 100 that have the capability to read and write to the system memories, such as a direct memory access (DMA)-capable I/O (input/output) device.

The link (i.e., bus, interconnect, etc.) that couples CPU 102 with system memory 134 may include one or more optical, metal, or other wires (i.e. lines) that are capable of transporting data, address, control, and clock information.

Platform controller hub (PCH) 136 (e.g., a complex of I/O controllers and other circuitry) includes an I/O interface that enables communication between the CPU 102 and external I/O devices. The complex may include one or more I/O adapters, such as I/O adapter 138. I/O adapters translate a host communication protocol utilized within the CPU 102 to a protocol compatible with a particular I/O device, such as I/O device 140. Some of the protocols that a given I/O adapter may translate include a Peripheral Component Interconnect (PCI)-Express, Universal Serial Bus (USB), Serial Advanced Technology Attachment (SATA), Small Computer System Interface (SCSI), Redundant Array of Inexpensive Disks (RAID), and 1394 "Firewire," among others. Additionally, there may be one or more wireless protocol I/O adapters. Examples of wireless protocols are Bluetooth, IEEE 802.11-based wireless protocols, and cellular protocols, among others.

Apart from I/O devices, the PCH 136 also may be coupled to one or more embedded controllers (ECs) in the system, such as EC 142. EC 142 may incorporate a number of functions. For example, a RAID storage controller device may be present within computer system 100. The RAID controller may manage an array of hard disk drives or solid state disks (SSDs). Other examples of the controller device may be a discrete out-of-band manageability engine, a keyboard controller, or another type of controller.

In other embodiments, PCH 136 is a discrete device located externally to the CPU 102. In these embodiments, an interface such as a direct memory interface (DMI) couples the CPU to the PCH. Though, these embodiments are not shown.

Inter-CPU interface 144 may provide an interface to a link coupled to one or more additional CPUs and allow inter-CPU communications to take place. E.g., Inter-CPU high-speed interface may be a Quick Path Interconnect (QPI) or other similar interface. Although additional CPUs are not shown in FIG. 1, in many embodiments CPU 102 is one of multiple CPUs present within computer system 100. In many embodiments, Inter-CPU interface 144 provides a point-to-point high-speed communication interface between CPU 102 and each of the other CPUs present in the system.

Graphics interface 146 may provide an interface to a link coupled to a discrete graphics controller (a discrete graphics controller is not shown). The interface may be a high-speed PCI-Express interface or another high-speed interface. In other embodiments, CPU 102 includes an integrated graphics controller and graphics interface 146 may be coupled to a display device, such as a monitor. In many embodiments, the interface is high-speed to allow for significant graphical data traffic to be transferred across the link (e.g., 3D graphics, video, etc.).

The computer system 100 also includes a system management firmware 148 to provide boot instructions to initialize the computer system and components. In different embodiments, system management firmware may be a basic input/output system (BIOS), an extendible firmware, or another form of firmware instructions the computer system may utilize during the boot of the platform.

In many embodiments, each core within computer system 100 includes internal logic to provide at least some compressed-sized micro-operations. Generally, a macro instruction provided to a core for execution is sent to the instruction decoder 118. The instruction decoder decodes the macro instruction into one or more micro-operations (UOPs). The UOPs are then passed to the execution unit for execution in the core. In many embodiments, there may be multiple instruction decoders in a core, though only one is shown for purposes of clarity.

The decoding process utilizes at least a programmable logic array (PLA) and/or an instruction read-only memory (ROM) to store lookup translations for macro instructions. The stored logic in the PLA/ROM translates an incoming macro instruction into the one or more UOPs. Specifically, the PLA and/or the ROM include storage space for each potential UOP with all of the UOP's fields. There may be many fields associated with a given UOP. There are the main fields associated with a UOP such as a source register field and destination register field. Additionally, there is other information that may be encoded into the main fields and/or utilize additional fields. For example, many processors encode the data type (e.g., integer, floating point, segment) into a register field. This particular UOP field information may be unnecessary since the data type can be deduced from the context of the UOP. E.g., A UOP that performs an integer operation will be utilizing an integer register, thus, the data type for the register is essentially redundant. There are certain redundancies such as this throughout the PLA/ROM storage logic.

Therefore, the instruction decoder 118 in FIG. 1 also includes additional UOP compression storage logic 116 to store UOPs that have had unnecessary information removed which results in many UOP fields having a reduced size or being removed altogether. Although a given UOP stored in the UOP compression storage logic may have a reduced number of data fields and/or a reduced size of one or more of the data fields, the execution unit will need the full, original-sized UOP with fully-expanded data fields. In order to accomplish this, at a point later in the instruction decoder 118, UOP extraction logic 128 receives each UOP with one or more compressed data fields and performs a decompression to return the UOP data fields to their full-sizes.

Figure 2:
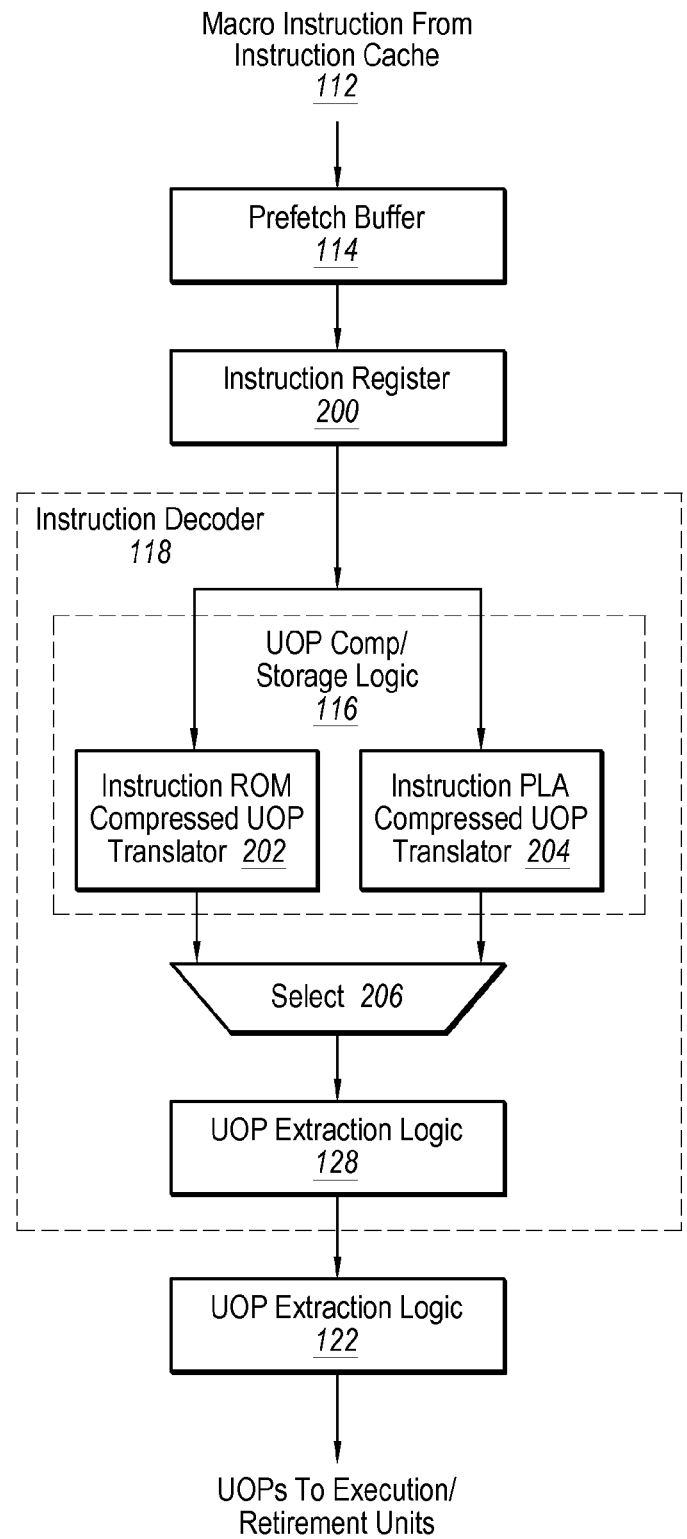
FIG. 2 illustrates an embodiment of the stages of an instruction pipeline passing through the instruction decoder with compressed UOP translation and extraction.

FIG. 2 illustrates an embodiment of the stages of an instruction pipeline passing through the instruction decoder with compressed UOP translation and extraction.

Initially, a macro instruction is sent from the instruction (L1) cache 112 to the prefetch buffer 114. The prefetch buffer 114 prefetches instructions which are then sent into the instruction register 200 for decode processing. Once the instruction is latched into the instruction register 200, the instruction enters into the instruction decoder 118 and arrives at the instruction ROM 202 and the Instruction PIA 204. In many embodiments, there are multiple ROMs and/or PLAs, though only one of each is shown here for clarity.

In many embodiments, the PLA 204 decodes standard 1, 2, and 3-byte macro instructions and the instruction ROM is utilized for complex macro instructions. Both the instruction ROM and the instruction PLA are storage locations (i.e. UOP compression storage logic 116) where hundreds of UOPs are stored. The instruction decoder 118 includes logic that allows a lookup of a macro instruction in the PLA and/or instruction ROM.

Depending on the type of instruction, a resulting set of one or more UOPs will be sent from the PLA and/or ROM to a select multiplexer (MUX) 206. The select MUX determines whether the UOPs received from the PLA or the ROM will be utilized and sent on to the execution unit. Select MUX 206 may include additional inputs that are not shown for sake of clarity. The additional inputs may provide the select MUX 206 the information needed to determine whether the PLA or ROM UOPs will be utilized. For example, a full instruction length decoder (not shown) may provide an input to select MUX 206 for length verification purposes to allow select MUX 206 to make the determination.

Once the one or more UOPs have been sent on via the select MUX 206, the UOPs enter UOP extraction logic 128. The extraction logic determines whether each arriving UOP is currently utilizing a set of full-sized data fields or whether one or more of the data fields have a compressed size or are missing entirely. If a UOP is missing a data field or has a compressed data field, UOP extraction logic 128 returns the data field(s) to the original size utilizing one or more determinations. The specific set of determinations UOP extraction logic 128 makes is discussed in detail below in FIG. 3 and FIG. 4. In general, there are several types of compression/extraction techniques to minimize the required storage space for each UOP in the PLA and ROM.

In many embodiments, there are multiple types of space compression techniques for UOP data fields. Utilizing these techniques allows both a reduction in the number of data fields that are necessary to store with the UOP as well as a reduction of the size of many of the remaining data fields that are stored.

One UOP data field compression technique includes determining the content of an absent field by examining the context from one or more other fields in the set of stored fields. For example, UOPs have source and destination registers. Each of these registers has a type to determine whether the register utilized stores an integer, floating point, or segment value. The context of the UOP can determine the type of register utilized without requiring a field to explicitly state the type. E.g., floating point operations will utilize the floating point type inherently.

Another UOP data field compression technique includes designating a group of UOP data fields to have a restricted amount of usable space. For example, instead of utilizing a fully addressable address in a field, determine a limited address space utilized and reduce the size of the required address stored in a given field. This would allow one or more bits of address data in an address data field to be left out of the field when stored in a PLA or ROM. Extraction would know the limited space and have the capability of expanding the compressed values back into format compatible with the rest of the computer Yet another UOP data field compression technique includes removing separate data fields for fused UOPs. Data space for a given fused UOP is chosen carefully so that control data fields from a first UOP created from the fused UOP may be derived from control data fields present in a second UOP created from the fused UOP. Essentially, instead of separate data fields utilized by certain shared UOPs, the separate UOPs that are the result of splitting the fused UOP require simply one UOP's data fields while the other UOP's data fields are created by the extraction logic. Although the UOP extraction logic 128, represented here as well as below in FIG. 3 and FIG. 4, is shown as always receiving the output of select MUX 206, in many other embodiments that are not shown some or all of the UOP extraction logic 128 is located directly after the 202 and 204 translators (i.e., prior to select MUX 206).

Figure 3:
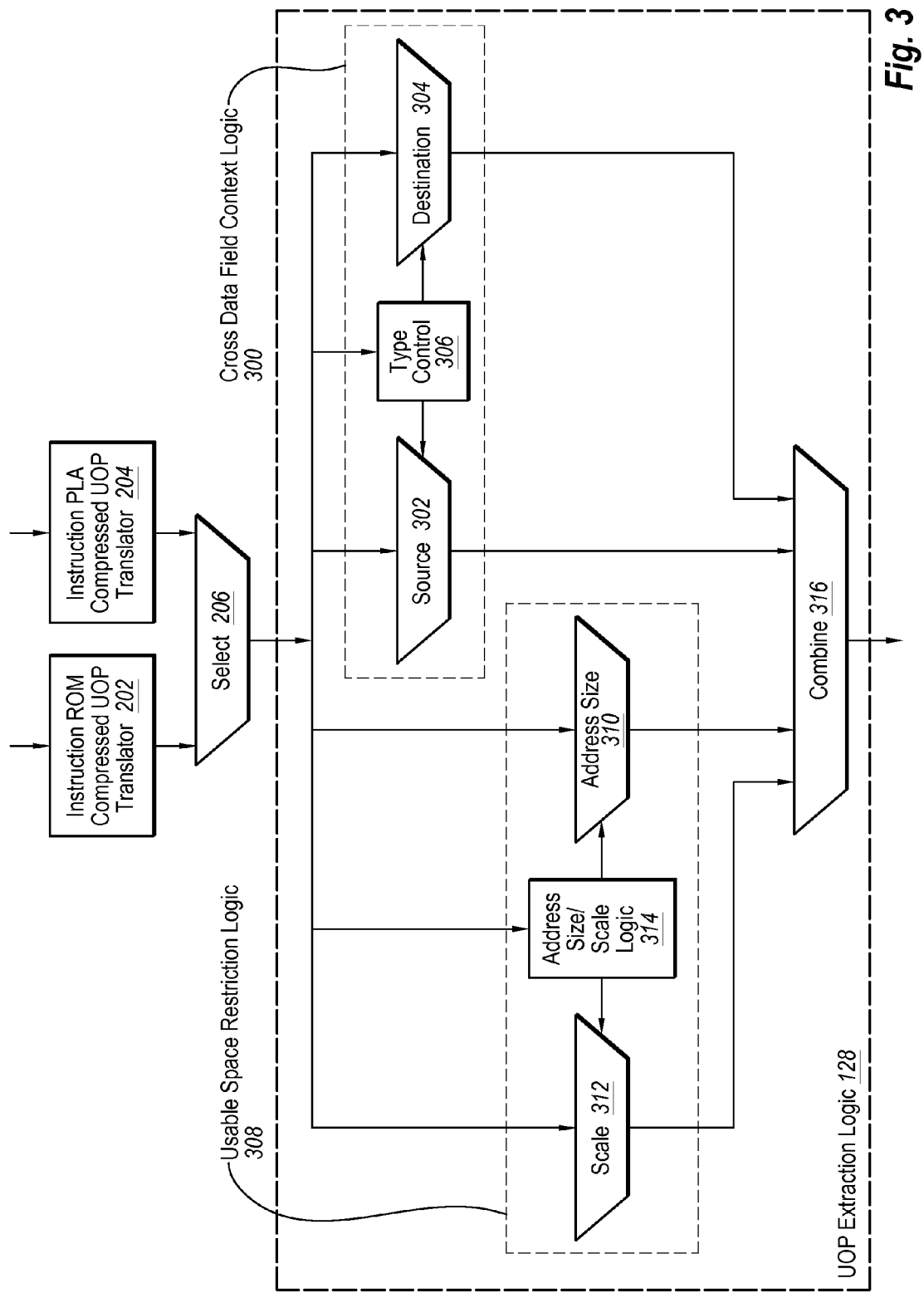
FIG. 3 and FIG. 4 illustrate embodiments of logic within an instruction decoder to store micro-operations with compressed data fields and, subsequently, to extract the compressed data fields into uncompressed data fields.
Figure 4:
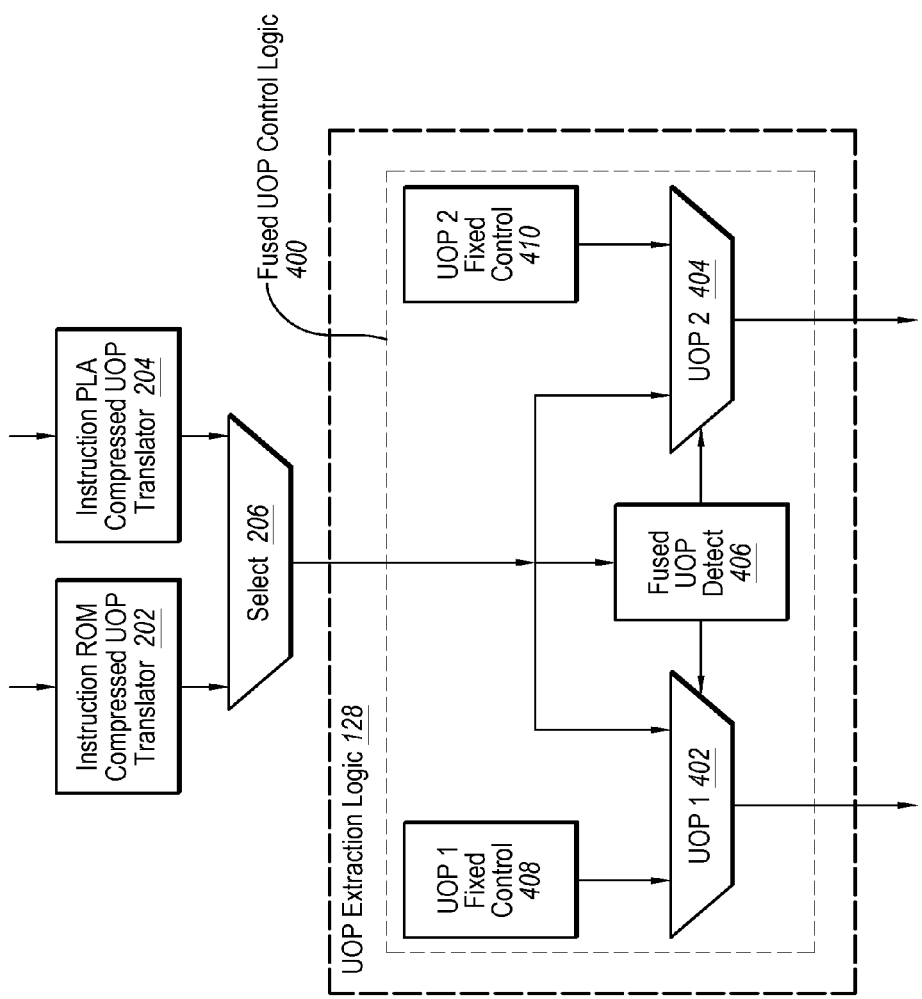

FIG. 3 and FIG. 4 illustrate embodiments of logic within an instruction decoder to store micro-operations with compressed data fields and, subsequently, to extract the compressed data fields into uncompressed data fields.

These two figures include detailed versions of the extraction logic 128 from FIG. 1 and FIG. 2. As discussed above in relation to FIG. 2, the macro instruction is utilized to perform a lookup in the instruction ROM compressed UOP translator 202 and the instruction PLA compressed UOP translator 204. The results are sent in the form of UOP(s) to the select MUX 206, which in turn determines which output to send on to the execution unit(s). The correct UOP(s) are then sent into the UOP extraction logic 128.

Each UOP is sent to several logic components for UOP data field extraction determination within UOP extraction logic 128.

Regarding FIG. 3, a first extraction component is the cross data field context logic 300. Logic 300 retrieves the source 302 data field and the destination data field 304 and determines whether either of these data fields is missing an integrated type control data field (e.g., of type integer). Type control logic 306 then provides the type control data field to the UOP if one is missing by inspecting the UOP functionality as well as potentially the other data field. Therefore, when logic 300 completes this process, if the UOP entered without a type data field, that type data field will be added and the UOP will be sent on to the execution units.

A second extraction component is the usable space restriction logic 308. Logic 308 retrieves address size 310 data field and scale 312 data field. The address size data field may include information as to whether the address represents 32-bit address space, 64-bit address space, etc. The address size deals with addressable space and its limits. In many embodiments, the processor does not utilize all of potential addressable space and instead works within the confines of a smaller addressable space. In these embodiments, the address size 310 data field may not include the full complement of addressable space when stored.

Additionally, scale 312 data field may provide a data set the boundary with which each element in the set adheres to. The scale component can increase or decrease the working and usable space for each component, so a memory array of a certain number may double if the scale of each component doubles. Again, the theoretical range of the scale data field components may be much larger than the practical usage points, thus the scale 312 data field may be stored with a much smaller number of bits corresponding to the usage model of the adjustment in scale. For example, if scale were to always remain static for a specific UOP, the scale 312 data field would become unnecessary. The address size/scale logic 314 may interpret the small or non-existent versions of the address size and scale data fields in the UOP and expand them to their full, uncompressed sizes to be utilized by the remainder of the computer.

In many embodiments, the results from the cross data field context logic 300 and the usable space restriction logic 308 are then combined 316 to create a UOP with uncompressed data fields to be sent to the execution unit(s).

Regarding FIG. 4, the elements that were first discussed in FIG. 2, a macro instruction is utilized to perform a lookup in the instruction ROM compressed UOP translator 202 and the instruction PLA compressed UOP translator 204, are again present. The results are sent in the form of UOP(s) to the select MUX 206, which in turn determines which output to send on to the execution unit(s). The correct UOP(s) are then sent into the UOP extraction logic 128.

Each UOP is sent to several logic components for UOP data field extraction determination within UOP extraction logic 128.

A third extraction component is fused UOP control logic 400. Logic 400 derives data fields in one UOP from data fields in another, related UOP. Specifically, two UOPs that are part of a fused UOP are sent into UOP 1 logic 402 and UOP 2 logic 404. The fused UOP detect logic 406 may create one or more data fields in each separate UOP from a single data field stored with the fused UOP. Thus, in storage, instead of having a fused UOP that has two sets of data fields, each set corresponding to one of the two UOPs derived from the fused UOP, in this scenario fused UOP detect logic 406 creates data fields per separate UOP (1 and 2) from the single fused set as well as from UOP fixed control data fields 408 and 410. The derivation allows a single set of control data fields to be stored with the fused UOP, therefore saving storage space.

Figure 5:
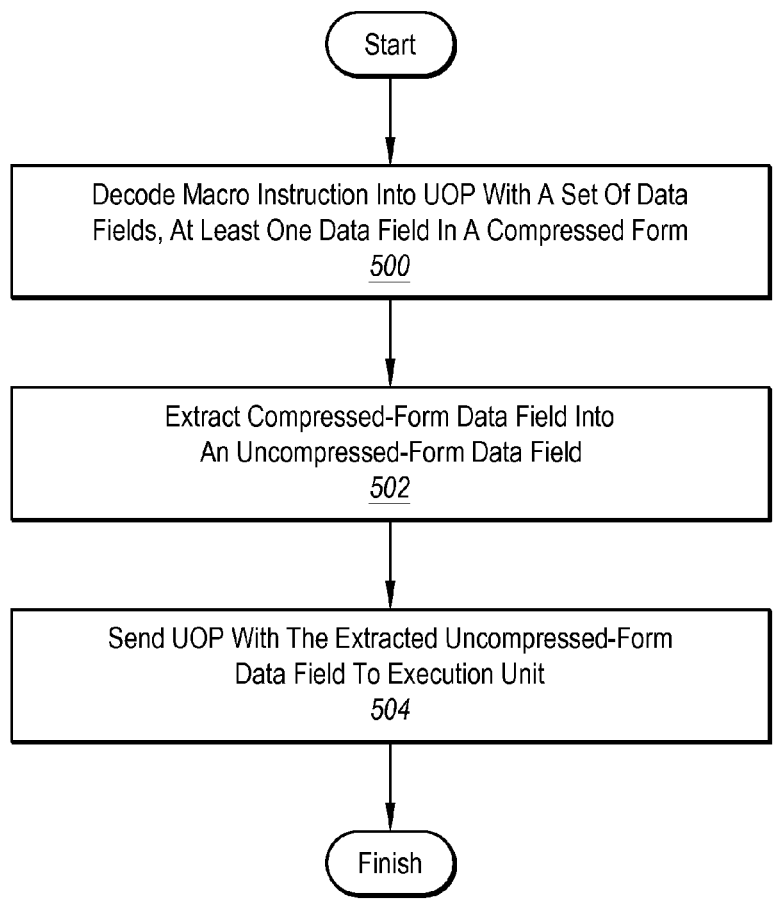
FIG. 5 is a flow diagram of an embodiment of a process capable of providing for and operating with compressed data fields in micro-operations.

FIG. 5 is a flow diagram of an embodiment of a process capable of providing for and operating with compressed data fields in micro-operations.

The process is performed by processing logic which may comprise hardware circuitry, firmware code, or a combination of both. The process begins by processing logic decoding a macro instruction into at least one micro-operation with a set of data fields. In this process at least one of the data fields is stored in a compressed form (processing block, wherein at least one data field in the set of data fields is in a compressed form (processing block 500).

The process continues with processing logic extracting the compressed-form data field into a corresponding uncompressed-form data field (processing block 502).

Finally, the process concludes by processing logic sending the UOP with the extracted uncompressed-form data field to an execution unit in the computer for execution (processing block 504) and the process is finished.

Elements of embodiments of the present invention may also be provided as a computer-readable medium for storing the computer-executable instructions. The computer-readable medium comprises a non-transitory storage means and may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, or other type of computer-readable media suitable for storing electronic instructions.

In the description above and in the claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate, interact, or communicate with each other.

In the description above, certain terminology is used to describe embodiments of the invention. For example, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a microcontroller, or the like.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The invention claimed is:

1. A computer for executing instructions, comprising:
   an instruction decoder unit to decode a macro instruction into at least one micro-operation with a set of data fields, wherein at least one data field in the set of data fields is in a compressed form, the instruction decoder unit including:
   storage logic to store the at least one micro-operation with the at least one compressed-form data field;
   extraction logic to
   extract the at least one compressed-form data field into an uncompressed-form data field; and
   send the at least one micro-operation with the extracted uncompressed-form data field to an execution unit for execution; and
   an execution unit to execute the at least one micro-operation, wherein the extraction logic comprises usable space restriction logic to receive an address size data field and a scale data field, the address size data field does not include a full complement of addressable space when stored in the compressed form and the scale data field is stored with a smaller number of bits than a scaled data field of the uncompressed-form data field, the smaller number of bits corresponding to a usage model of an adjustment in scale to represent a working and usable space.

2. The computer of claim 1, wherein the extraction logic is further operable to:

determine a content of the at least one compressed-form data field from a context of one or more additional data fields of the set of data fields.

3. The computer of claim 1, wherein the extraction logic is further operable to:
determine a content of the at least one compressed-form data field from a context of the at least one micro-operation.

4. The computer of claim 1, wherein the extraction logic is further operable to:
fuse at least a second micro-operation and a third micro-operation into a fused micro-operation, wherein the fused micro-operation utilizes at least a first control data field from a corresponding control data field of the second micro-operation.

5. The computer of claim 1, wherein the storage logic is to store the at least one micro-operation with a missing data field, wherein the at least one data field in the compressed form is the missing data field, wherein the at least one data field is in the compressed form by the storage logic not storing the at least one data field with the at least one micro-operation, the extraction logic being operable to derive one or more bits of data to add to the at least one micro-operation for the corresponding uncompressed-form data field.

6. The computer of claim 1, wherein the storage logic comprises a programmable logic array.

7. The computer of claim 1, wherein the storage logic comprises a read-only memory.

8. A micro-operation compression circuit in a processor with a multi-stage pipeline, the circuit comprising:
instruction decode logic to decode a macro instruction into at least one micro-operation with a set of data fields, wherein at least one data field in the set of data fields is in a compressed form;
storage logic to store the at least one micro-operation with the at least one compressed-form data field; and
extraction logic to
extract the at least one compressed-form data field into an uncompressed-form data field; and
send the at least one micro-operation with the extracted uncompressed-form data field to an execution unit for execution, wherein the extraction logic comprises fused control logic to receive a fused micro-operation for two micro-operations, wherein the fused micro-operation is stored with a single data field instead of two separate data fields for the two micro-operations, and wherein the fused control logic stored is to create a first data field for a first one of the two micro-operations and a second data field for a second one of the two micro-operations from the single data field stored with the fused micro-operation.

9. The circuit of claim 8, wherein the extraction logic is further operable to:
determine a content of the at least one compressed-form data field from a context of one or more additional data fields of the set of data fields.

10. The circuit of claim 8, wherein the extraction logic is further operable to:
determine a content of the at least one compressed-form data field from a context of the at least one micro-operation.

11. The circuit of claim 8, wherein the extraction logic is further operable to:
restrict a usable amount of space for the at least one compressed-form data field to a subset of the space allowed for use by the corresponding uncompressed-form data field.

12. The circuit of claim 8, wherein the storage logic is to store the at least one micro-operation with a missing data field, wherein the at least one data field in the compressed form is the missing data field, wherein the at least one data field is in the compressed form by the storage logic not storing the at least one data field with the at least one micro-operation, the extraction logic being operable to derive one or more bits of data to add to the at least one micro-operation for the corresponding uncompressed-form data field.

13. The circuit of claim 8, wherein the storage logic comprises a programmable logic array.

14. The circuit of claim 8, wherein the storage logic comprises a read-only memory.

15. A non-transitory computer-readable medium having stored thereon instructions, which if executed by a computer causes the computer to perform operations comprising:
decoding a macro instruction into at least one micro-operation with a set of data fields, wherein at least one data field in the set of data fields is in a compressed form;
extracting the at least one compressed-form data field into an uncompressed-form data field; and
sending the at least one micro-operation with the extracted uncompressed-form data field to an execution unit in the computer for execution, wherein the extracting comprises:
receiving a source data field and a destination data field for the at least one micro-operation;
determining whether either of the source data field or the destination data field is missing a type control data field;
inspecting a functionality of the at least one micro-operation; and
providing the type control data field to the at least one micro-operation in view of the inspecting before the sending the at least one micro-operation to the execution unit.

16. The computer-readable medium of claim 15, wherein the operations further comprises
determining a content of the at least one compressed-form data field from a context of one or more additional data fields of the set of data fields.

17. The computer-readable medium of claim 15, wherein the operations further comprises
determining a content of the at least one compressed-form data field from a context of the at least one micro-operation.

18. The computer-readable medium of claim 15, wherein the operations further comprises
restricting a usable amount of space for the at least one compressed-form data field to a subset of the space allowed for use by the corresponding uncompressed-form data field.

19. The computer-readable medium of claim 15, wherein the operations further comprises
fusing at least a second and a third micro-operation into a fused micro-operation, wherein the fused micro-operation utilizes at least a first control data field from a corresponding control data field of the second micro-operation.

* * * * *